US000001278H

United States Statutory Invention Registration [19]

[11] Reg. Number: H1278

George

[43] Published: Jan. 4, 1994

[54] ELASTOMERIC, CERAMIC FIBER REINFORCED POLYKETONE POLYMER BLENDS

[75] Inventor: Eric R. George, Houston, Tex.

[73] Assignee: Shell Oil Company, Houston, Tex.

[21] Appl. No.: 239,095

[22] Filed: Aug. 31, 1988

[51] Int. Cl.[5] ..... C08L 51/00

[52] U.S. Cl. ..... 524/504

[58] Field of Search ..... 524/504, 612; 528/392

[56] References Cited

U.S. PATENT DOCUMENTS

| | | | |
|---|---|---|---|
| 2,495,286 | 1/1950 | Brubaker | 260/63 |
| 3,113,986 | 12/1963 | Breslow et al. | 260/683.9 |
| 3,251,905 | 5/1966 | Zelinski | 260/879 |
| 3,390,207 | 6/1968 | Moss et al. | 260/879 |
| 3,598,887 | 8/1971 | Darcy et al. | 260/879 |
| 3,694,412 | 9/1972 | Nozaki | 260/63 |
| 3,948,873 | 4/1976 | Hudgin . | |
| 4,219,627 | 8/1980 | Halasa et al. | 525/89 |
| 4,226,952 | 10/1980 | Halasa et al. | 525/192 |
| 4,292,414 | 9/1981 | Saito et al. | 525/255 |
| 4,427,826 | 1/1984 | Hergenrother et al. | 525/66 |
| 4,472,545 | 9/1984 | Coughlin et al. | 524/522 |
| 4,578,429 | 3/1986 | Gergen et al. | 525/291 |
| 4,657,970 | 4/1987 | Shiraki et al. | 525/57 |
| 4,657,971 | 4/1987 | Shiraki et al. | 525/57 |
| 4,670,173 | 6/1987 | Hayashi et al. | 252/51.5 |

FOREIGN PATENT DOCUMENTS

| | | |
|---|---|---|
| 0121965 | 10/1984 | European Pat. Off. . |
| 0181014 | 5/1986 | European Pat. Off. . |
| 284189 | 9/1988 | European Pat. Off. . |
| 1081304 | 8/1967 | United Kingdom . |

OTHER PUBLICATIONS

Ceramic Fiber: A New Alternative Short Fiber Reinforcement. Wheeler et al, 42nd Annual Conf Composite Inst. Feb. 2-6, 1987.

Fiberfrax Chopped Fiber, Product Specs. Sohio Carborundum (1986).

The Role of Aminosilanes; Ishida et al, 42nd Annual Conf, Composites Institute, The Society of the Plastics Industry, Inc. Feb. 2-6, 1987.

*Primary Examiner*—Robert L. Stoll

*Assistant Examiner*—Joseph D. Anthony

[57] ABSTRACT

A composition comprising a non-miscible blend of, as a major component, a linear alternating polymer of carbon monoxide and at least one ethylenically unsaturated hydrocarbon and lesser amounts of a maleated, partially hydrogenated block copolymer, said block copolymer having at least one at least predominantly polymerized vinyl aromatic compound block and at least one at least predominantly aliphatic polymerized conjugated alkadiene block, and ceramic fiber reinforcement.

12 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELASTOMERIC, CERAMIC FIBER REINFORCED POLYKETONE POLYMER BLENDS

FIELD OF THE INVENTION

This invention relates to an improved polymer blend comprising predominantly a linear alternating polymer of carbon monoxide and at least one ethylenically unsaturated hydrocarbon. More particularly, the invention relates to ternary blends comprising a major proportion of the linear alternating polymer and lesser proportions of a maleated, partially hydrogenated block copolymer, and ceramic fiber reinforcement.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. 1,081,304 produced similar materials of higher carbon monoxide content in the presence of alkylphosphine complexes of palladium salts as catalyst. Nozaki extended the process to prepare linear alternating polymers in the presence of arylphosphine complexes of palladium moieties and certain inert solvents. See, for example, U.S. Pat. No. 3,964,412.

More recently, the class of linear alternating polymers has become of greater interest in part because of the greater availability of the polymers in quantity. These polymers, often referred to as polyketones or polyketone polymers, have been shown to be of the repeating formula —CO—(Z)— wherein Z is a moiety of ethylenically unsaturated hydrocarbon polymerized through the ethylenic unsaturation. By way of further example, when the unsaturated hydrocarbon is ethylene, the polyketone polymer will be of the repeating formula —CO—($CH_2$—$CH_2$)—. The general process for the more recent preparation of such polymers is illustrated by a number of Published European Patent Applications including 121,965 and 181,014. The process typically involves a catalyst composition formed from a salt of a Group VIII metal selected from palladium, cobalt or nickel, the anion of a strong non-hydrohalogenic acid and a bidentate ligand of phosphorus, arsenic or antimony.

The resulting polyketone polymers are relatively high molecular weight thermoplastics having established utility in the production of shaped articles such as containers for the food and drink industry and internal and external parts for the automotive industry, which articles are produced by conventional techniques such as injection molding or extrusion. For some particular applications it has been found to be desirable to have properties for a polymeric composition which are somewhat different from those of the polyketone polymers. It would be of advantage to retain the more desirable properties of the polyketone polymers and yet improve other properties. These advantages are often obtained through the provision of a polymer blend.

SUMMARY OF THE INVENTION

The present invention contemplates the provision of blends of a linear alternating polymer of carbon monoxide and at least one ethylenically unsaturated hydrocarbon with other polymeric materials. More particularly, there are provided, according to the invention, ternary blends comprising a major proportion of the linear alternating polymer and lesser amounts of a maleated, partially hydrogenated block copolymer and a ceramic reinforcement. Such blends exhibit improved toughness and impact resistance.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other alpha-olefins including propylene, butylene, isobutylene, 1-hexene, 1-octene and 1-dodecene, or are arylaliphatic containing an aromatic substituent on an otherwise aliphatic molecule, particularly an aromatic substituent on a carbon atom of the ethylenic unsaturation. Illustrative of this latter class of ethylenically unsaturated hydrocarbons are styrene, p-methylstyrene, m-propylstyrene and p-ethylstyrene. Preferred polyketone polymers are copolymers of carbon monoxide and ethylene or terpolymers of carbon monoxide, ethylene and a second hydrocarbon of at least 3 carbon atoms, particularly an alpha-olefin such as propylene.

The structure of the polyketone polymers is that of a linear alternating polymer of carbon monoxide and hydrocarbon(s) and there will be substantially one molecule of carbon monoxide for each molecule of hydrocarbon. When terpolymers of carbon monoxide, ethylene and a second hydrocarbon are employed as a component in the blends of the invention, there will be at least two units incorporating a moiety of ethylene for each unit incorporating a moiety of the second hydrocarbon. Preferably there will be from about 10 to about 100 units incorporating a moiety of ethylene for each unit incorporating a moiety of the second hydrocarbon. The polymer chain is therefore represented by the repeating formula $$\left[CO-(CH_2-CH_2)\right]_x\left[CO-(G)\right]_y$$

wherein G is the moiety of the second ethylenically unsaturated hydrocarbon polymerized through the ethylenic unsaturation. The —CO—($CH_2$—$CH_2$)— units and the —CO—(G)— units are found randomly throughout the polymer chain and the ratio of y:x is no more than about 0.5. In the modification of the invention where copolymer of carbon monoxide and ethylene is employed as the blend component, there will be no second hydrocarbon present and the polyketone polymer is represented by the above formula wherein y is 0. When y is other than 0, i.e., terpolymers are employed, ratios of y:x from about 0.01 to about 0.1 are preferred. The end groups or "caps" of the polymer chain will depend on what materials are present during the preparation of the polymer and whether and how the polymer has been purified. The precise properties of the polymer will not depend to any considerable extent upon the end groups so that the polymer is fairly represented by the above formula for the polymer chain.

Of particular interest are the polyketone polymers of number average molecular weight from about 1,000 to about 200,000, particularly those polyketone polymers of number average molecular weight from about 20,000 to about 90,000, as determined by gel permeation chromatography (GPC). The physical properties of such polymers will depend in part upon the molecular weight of the polymer, whether the polymer is a copolymer or a terpolymer and, in the case of terpolymers, the proportion of the second hydrocarbon present. Typical melting points of the polymers are from about 175° C. to about 300° C., more frequently from about 210° C. to about 270° C. The polymers have a limiting viscosity number (LVN) measured in a standard capillary viscosity measuring device in m-cresol at 60° C., of from about 0.4 to about 10, preferably from about 0.5 to about 4. Polyketone polymers having an LVN of from about 1.4 to about 2.3 are particularly preferred.

A method of preparing the polymers which is now becoming conventional is to contact the carbon monoxide and hydrocarbon(s) in the presence of a catalyst composition formed from a palladium compound, the anion of a non-hydrohalogenic acid having a pKa below about 6, preferably below about 2, and a bidentate ligand of phosphorus. The scope of the process for polyketone preparation is extensive but, without wishing to be limited, a preferred palladium compound is a palladium carboxylate, particularly palladium acetate, the preferred anion is the anion of trifluoroacetic acid or p-toluenesulfonic acid and the preferred bidentate phosphorus ligand is 1,3-bis(diphenylphosphino)propane or 1,3-bis[di(2-methoxyphenyl)phosphino]propane. Such a process for polyketone production is illustrated by copending U.S. patent application Ser. No. 930,468, filed Nov. 14, 1986.

Polymerization is conducted in a gas phase in the substantial absence of reaction diluent or in a liquid phase in the presence of a reaction diluent such as an alkanol, e.g. , methanol or ethanol. The reactants are contacted under polymerization conditions in the presence of the catalyst composition by conventional methods such as shaking or stirring in a suitable reaction vessel. Typical reaction temperatures are from about 20° C. to about 150° C., more often from about 50° C. to about 135° C. Suitable reaction pressures are from about 1 bar to about 200 bar, preferably from about 10 bar to about 100 bar. Subsequent to reaction, the polymer is recovered by conventional techniques such as filtration or decantation. The polymer product may contain residues of the catalyst composition which are removed, if desired, by treatment of the polymer product with a solvent or a complexing agent which is selective for the residues.

The second component of the ternary blends of the invention is a modified block copolymer which has been partially hydrogenated and further modified by the grafting of a maleic acid compound onto the block copolymer structure. The term "block copolymer" is used to indicate a thermoplastic elastomer characterized by at least one block of at least predominantly polymerized vinyl aromatic hydrocarbon (A block) and at least one aliphatic block of at least predominantly polymerized conjugated alkadiene (B block).

The vinyl aromatic hydrocarbon useful as the precursor of A blocks has a vinyl group, i.e. a

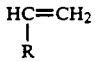

group, attached directly to an aromatic ring and has up to 12 car m inclusive. Preferred vinyl aromatic hydrocarbons are styrene and styrene homologs such as those of the formula

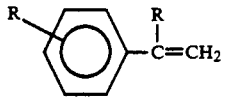

wherein R is hydrogen or alkyl of up to 4 carbon atoms. Illustrative of such compounds are styrene, alpha-methylstyrene, alpha-ethylstyrene, p-methylstyrene, p-ethylstyrene, m-propylstyrene and alpha,4-dimethylstyrene. Styrene and alpha-methylstyrene constitute a preferred class of vinyl aromatic hydrocarbons and particularly preferred is styrene.

The A blocks of the block copolymer independently are at least predominantly the polymerized vinyl aromatic hydrocarbon and preferably are homopolymeric blocks. Alternatively, however, one or more A blocks are blocks wherein some of the monomer of the B block is copolymerized with the predominant vinyl aromatic hydrocarbon monomer of block A. Such blocks are termed tapered and have at least about 85% by mol and preferably at least 93% by mol of the polymerized vinyl aromatic hydrocarbon with any remainder being the conjugated alkadiene of block B. A blocks containing a mixture of vinyl aromatic hydrocarbons are also suitable but are less preferred. The average molecular weight of an A block is typically from about 5,000 to about 125,000 while A blocks of an average molecular weight from about 7,000 to about 125,000 are preferred.

Each B block independently is at least predominantly polymerized conjugated alkadiene. The alkadienes useful as the monomer for a B block are conjugated alkadienes of up to 8 carbon atoms inclusive such as those conjugated dienes of the formula

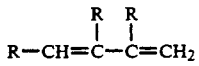

wherein R has the previously stated significance. Illustrative of such alkadienes are butadiene, isoprene, 2,3-dimethylbutadiene, 1,3-octadiene, 1,3-pentadiene and 2-methyl-1,3-hexadiene. Preferred conjugated alkadienes are butadiene and isoprene and butadiene is particularly preferred. Each B block is at least predominantly polymerized alkadiene with the B block being at least about 85% mol and preferably at least about 93% mol of polymerized alkadiene with any remainder being the vinyl aromatic hydrocarbon of the A blocks in the case of a tapered block. Homopolymeric blocks as each B block are preferred although tapered blocks and blocks of polymerized mixed alkadienes are also satisfactory. Within a polymerized alkadiene block two modes of polymerization are possible and are generally observed. In what is termed a 1,4 polymerization, each carbon atom of the four-carbon alkadiene moiety is incorporated within the polymer chain which then includes two carbon atoms joined by an ethylenic linkage. In what is termed 1,2 polymerization, the polymerization involves only one carbon-carbon double bond of the conjugated alkadiene. The carbon atoms of that bond will be incorporated into the polymer chain which will then contain a pendant unsaturated group. Control of the two modes of polymerization is within the skill of the art. Preferred block copolymers are those wherein from about 25% to about 55% of the units of each B block are the result of 1,2-polymerization. The average molecular weight of a B block is suitably from about 10,000 to about 300,000, preferably from about 30,000 to about 150,000.

Within the block copolymer, A block will total from about 2% by weight to about 55% by weight based on total block copolymer. Contents of A block from about 10% by weight to about 30% by weight, same basis, are preferred. The total molecular weight of the block copolymer will average from abut 25,000 to about 350,000 preferably from about 35,000 to about 300,000. These average molecular weights are determined by conventional techniques such as tritium counting methods or osmotic pressure measurements.

The structure of the block copolymer will depend upon the method of polymerization employed to produce the block copolymer. In one modification, the block copolymer is termed linear and is produced by sequential polymerization of the blocks. By way of example in producing a three-block or triblock polymer, the vinyl aromatic hydrocarbon of the A block is polymerized through the use of an initiator, preferably an alkyl lithium compound. The conjugated alkadiene of block B is then introduced and subsequently the vinyl hydrocarbon required for the second A block. Such a block copolymer is characterized as ABA. A two-block or diblock polymer is produced by polymerizing an A block using a lithium initiator and subsequently introducing the conjugated alkadiene of the second block. Such a polymer would be characterized as AB. Substantially complete polymerization of the monomer of each block prior to introducing the monomer of the next block will result in the formation of homopolymeric blocks. If, prior to the complete polymerization of any one block, the monomer of the next block is introduced a tapered block will result. Similar sequential polymerization techniques are employed to produce block copolymers characterized as ABABA, ABAB, ABABABA, or even polymers of a higher number of blocks. Production of block copolymers, particularly those of a relatively high number of blocks, is also accomplished through the use of a coupling agent to couple or connect growing polymer chains. Use of a difunctional coupling agent such as dihaloalkane will result in the production of linear polymers but use of a coupling agent having a functionality of three or more, e.g., silicon tetrahalides or dialkyl esters of dicarboxylic acids, will result in the formation of polymers which are termed radial or branched, respectively.

These block copolymers are well known in the art and the characterization and production of such polymers are illustrated by U.S. Pat. Nos. 3,251,905, 3,390,207, 3,598,887 and 4,219,627.

The block copolymers useful as precursors of the blend component of the invention are preferably linear polymers of the following types: polystyrene-polybutadiene (SB), polystyrene-polyisoprene (SI), polystyrene-polybutadiene-polystyrene (SBS), polystyrene-polyisoprene-polybutadiene (SIS), poly(alpha-methylstyrene-polybutadiene-poly(alpha-methylstyrene), poly(alpha-methylstyrene)-polyisoprene-poly(alpha-methylstyrene). Block copolymers of the SBS type are particularly preferred. These block copolymers are now conventional and a number are commercially available and marketed by Shell Chemical Company as KRATON® Thermoplastic Rubber.

To produce the blend component of the invention, the block copolymers are partially hydrogenated and then modified further by reaction with a maleic anhydride compound. The hydrogenation of block copolymers is also well known in the art and includes catalytic hydrogenation in the presence of Raney nickel or elemental noble metal in finely divided form, e.g., finely divided platinum or palladium. Such hydrogenation typically results in the hydrogenation of most if not all of the unsaturation of the aromatic unsaturation in the A blocks as well as the ethylenic unsaturation of aliphatic B block. In the production of the components of the blends of the invention, a partial hydrogenation is employed which serves to hydrogenate most of the unsaturation of each aliphatic B block while not hydrogenating the unsaturation of the aromatic rings of A blocks to any substantial extent. The process of hydrogenation is illustrated by the disclosures of U.S. Pat. Nos. 3,113,986 and 1,4,226,952. Suitable partially hydrogenated block copolymers are those wherein no more than 25% and preferably no more than 5% of the aromatic unsaturation has been hydrogenated and in the hydrogenated polymerized conjugated alkadiene block the residual unsaturation is from about 0.5% to about 20% of the unsaturation prior to hydrogenation.

The partially hydrogenated block copolymer is often identified by the structure of the block copolymer precursor and the "apparent" structure of the aliphatic block(s). Thus, partial hydrogenation of an SBS block polymer will result in a polymer having a hydrogenated mid-block which is apparently polyethylene in the case of a mid-block produced by 1,4-polymerization and ethylene/butylene copolymer in the case of a mid-block unit produced with a portion of 1,2-polymerization and a portion of 1,4-polymerization. These are indicated by SES and SEBS respectively. A corresponding diblock polymer would be termed SE or SEB. The polymer produced by partial hydrogenation of a SIS block copolymer of a high degree of 1,4-structure in the mid-block is termed, upon hydrogenation, a SEPS polymer because of the similarity of the mid-block to an ethylene/propylene copolymer. To produce the maleated, partially hydrogenated block copolymers preferred as components of the blends of the invention, partially hydrogenated block polymers of the SES/-SEBS type wherein units of the mid-block are from about 45% to about 65% of the E mid-block type and the remainder being of the EB type. The partially hydrogenated block copolymers of these types are also well known in the art with a number being commercial. For example, certain of the partially hydrogenated block copolymers are marketed by Shell Chemical Company as KRATON® G Thermoplastic Rubber.

The maleated, partially hydrogenated block copolymer employed as a component in the blends of the invention is an adduct of the partially hydrogenated block copolymer and a maleic anhydride compound. The maleated polymers are illustratively produced by the addition of a hydrogen atom located on a carbon atom allylic to residual unsaturation of the partially hydrogenated block copolymer to the carbon-carbon double bond of the maleic anhydride compound together with the formation of a carbon-carbon bond between the maleic anhydride compound and the polymer chain of the partially hydrogenated block copolymer. By way of illustration, but without wishing to be bound by any particular reaction theory, the production of maleated block copolymer takes place according to the reaction scheme which follows, wherein the wavy lines represent the continuing polymer chain

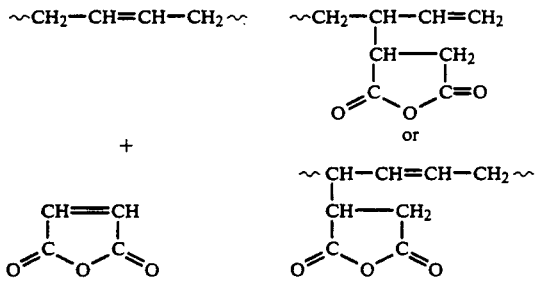

Maleic anhydride compounds which are suitably employed in the production of the maleated, partially hydrogenated block copolymers include maleic acid, maleic anhydride, mono-alkylesters of maleic acid wherein the alkyl is lower alkyl of up to 4 carbon atoms inclusive, the mono-amide of maleic acid and maleic imide. Of the maleic acid compounds, the use of maleic anhydride is preferred.

The maleated, partially hydrogenated block copolymers are known in the art as is the method of their production. In general, the process for the production of the maleated product is a graft process wherein the maleic acid compound is grafted onto the aliphatic portion of the partially hydrogenated block copolymer chain. In one modification, the partially hydrogenated block copolymer and the maleic acid compound are contacted in the presence of a free radical initiator which is preferably a peroxy compound. Contacting customarily takes place at a temperature sufficient to melt the reactants and to decompose the initiator, for example a temperature from about 75° C. to about 450° C., more often from about 2000C to about 300° C. Such reactions are often conducted without a solvent or reaction diluent and often in an extruder which serves to melt and mix the reactants and to heat the mixture to the desired elevated temperature. In alternate modifications, the partially hydrogenated block copolymer and the maleic acid compound are contacted in solution in a suitable solvent in the absence of a free radical initiator at an elevated temperature on the order of from about 150° C. to about 200° C. Often, free radical inhibitors are added in these latter modifications to inhibit gelling.

The extent of the maleation of the partially hydrogenated block copolymer is dependent in part on the extent of residual unsaturation of the polymer aliphatic block(s). In terms of the polymers as described above, sufficient maleic acid compound is reacted with the partially hydrogenated block copolymer to produce a maleated derivative containing from abut 0.02% by weight to about 20% by weight, based on total polymer, of the moiety derived from the maleic acid compound grafted onto the aliphatic portion of the partially hydrogenated block copolymer. Preferably the maleated product will contain from about 0.1% by weight to about 10% by weight of the maleic acid moiety on the same basis, and most preferably from about 0.2% by weight to about 5% by weight of the maleic acid compound moiety.

In general, the solvent-free "extruder-type" maleation process is preferred. Disclosures of such processes, now conventional, are found in U.S. Pat. Nos. 4,292,414, 4,427,828, 4,628,072, 4,657,970 and 4,657,971. Other processes are disclosed in U.S. Pat. Nos. 4,578,429 and 4,670,173.

Certain of the maleated, partially hydrogenated block copolymers are commercial and some are marketed by Shell Chemical Company as KRATON G Thermoplastic Rubber. A particularly preferred maleated, partially hydrogenated block copolymer is marketed as KRATON G 1901X Thermoplastic Rubber and is characterized as a maleated block copolymer of the SES/SEBS type (SEBS) with a styrene content of 28% by weight, a specific gravity of 0.91 and a maleic acid functionality, as grafted maleic anhydride, of 2% by weight.

The blends of the invention comprise a major proportion of the linear alternating polymer of carbon monoxide and at least one ethylenically unsaturated hydrocarbon and lesser proportions the maleated, partially hydrogenated block copolymer and a ceramic reinforcement.

The reinforcing fiber suitable for use in the compositions of the invention is called refractory ceramic fiber, (RCF), also referred to as ceramic fiber or alumina-silica fiber. RCF is typically composed of about an equal parts blend of the oxides silica and alumina. In contrast to silicate glasses, such as E-glass or mineral fiber, RCF has only trace or slightly higher amounts of the oxides of alkali metals such as sodium, alkaline earth metals such as calcium, and oxides of other metals such as titanium, and iron. The very low amounts of alkali present in RCF provide a surface that is generally free of alkali metal ion exchange and interactions, and is inherently more resistant to moisture attack. Although there are few monovalent cations on the fiber surface, there are silanol groups (—Si—OH) on the surface which can interact to provide surface modification to a fiber/matrix interface.

Refractory ceramic fibers are conventionally prepared in a melting operation by fusing raw materials in an electric arc furnace to produce a molten stream. The molten stream is impinged on by air under high pressure or dropped onto spinning wheels which separates the stream into tiny fragments. The fragments form fiber and are rapidly cooled. Also produced in the melt process are molten droplets called "shot" which are spherical particles that do not transform into fibers. RCF can be processes to remove the shot, but typically the shot content does not significantly detract from the overall properties of the ceramic fiber. RCF is commercially available under the tradename Fiberfrax (TM) from Standard Oil Engineered Materials Company, Fibers Division and has traditionally been used in mat or textile form in high temperature applications such as furnace insulation. The fibers are also useful as reinforcements for polymeric products and are commercially used as such. However, the physical dimensions of the ceramic fibers are of some importance to successful utilization in a particular application as are the presence or absence of a sizing material or a coupling agent for the fibers and the nature of the sizing or coupling agent.

In the polyketone/maleated, partially hydrogenated block copolymer/ceramic fiber compositions of the invention, the ceramic fibers which contribute the most desirable properties to the composition are chopped ceramic fibers of circular cross-section. The fibers have an average diameter from about 1 micron to about 10 microns, preferably from about 2 microns to about 4 microns. Fibers of greater or lesser diameter are satisfactory but fibers of too small a diameter do not provide the desired strength and fibers of too large a diameter contribute too much weight for the resulting strength and may not be economical. Although in some applications the very short milled ceramic fibers or the long continuous ceramic fibers are satisfactory, in the compositions of the invention it is preferred to use short chopped ceramic fibers. Lengths of ceramic fiber from about 0.35 mm to about 15 mm are suitable. While somewhat longer and somewhat shorter lengths are also useful, too long a ceramic fiber detracts from the processability of the composition while too short a fiber does not provide the desired strength. It is recognized that the actual length of the ceramic fibers in the compositions will depend to some extent upon the method of blending or mixing the components, as this may mechanically break down the length of the ceramic fibers.

The ceramic fibers to be used as reinforcements for plastic materials may be provided by the manufacturer with a coating of a sizing or material or a coupling agent, which terms are often used interchangeably. The nature of the sizing or coupling agent will influence the interfacial shear strength of the fiber and the polymer matrix, i.e., the degree to which the polymer and ceramic fiber will adhere. Improvement in mechanical properties, such as tensile strength, result when a relatively high degree of adhesion occurs between the polymer and the fiber. To contribute strength to a polymer blend, the interfacial shear strength will be at least comparable in magnitude to the shear strength of the polymer so that there will be good adhesion between the polymer and the ceramic fiber. The interfacial shear strength is influenced by the polarity of the polymer so that for some polymers certain sizings or coupling agents work better than others. For the case of blends containing polyketone polymers a variety of sizings are suitable. Such sizings are generally characterized by the general nature of the size rather than the specific chemical structures which are often proprietary to the ceramic fiber manufacturer. Suitable sizings include water emulsions of starch and lubricating oil, aqueous dispersions of surface active materials and lubricants, silicon-containing materials such as vinyl silanes, alkyltrimethoxysilanes, amino silanes, trimethoxysilanes which may also contain urethane, acrylate or epoxy functionalities, and non-polar hydrocarbons. Ceramic fibers containing such sizings are commercially available and are exemplified by Fiberfrax® 6000 RPS Fiber and Fiberfrax® EF112 Fiber which are available from Standard Oil Engineered Materials Company, Fibers Division.

The blends of the invention comprise a major amount of the linear alternating polymer of carbon monoxide and at least one ethylenically unsaturated hydrocarbon with lesser amounts of the maleated, partially hydrogenated block copolymer and ceramic reinforcement Amounts of the maleated, partially hydrogenated block copolymer from about 0.5% by weight to about 10% by weight, based on total blend are satisfactory with amounts from about 2% by weight to about 7% by weight, same basis, being preferred. The ceramic reinforcement is present in an amount of from about 0.1% by weight to about 45% by weight, based on total blend. Amounts from about 0.5% by weight to about 35% by weight on the same basis are preferred.

Additionally, a fourth component may optionally be added to this essentially three-part blend. This fourth component can be up to 5 wt % of a processing aid, such as an ethylene unsaturated acid copolymer, like EAA, commercially available as Primacor 1410. Amounts of from 0.1 wt % to 5 wt % may be used, with the amounts 1 wt %, 2 wt %, and 5 wt % being particularly usable herein. The ethylene-unsaturated acid copolymers which were blended with the polyketone according to the invention are copolymers of ethylene and $\alpha,\beta$-ethylenically unsaturated carboxylic acids. Although a variety of $\alpha,\beta$-ethylenically unsaturated carboxylic acids of up to 10 carbon atoms, or in some cases more, are useful as a component of the ethylene copolymers, e.g., 2-hexanoic acid, 2-octenoic acid and 2-decenoic acid, the preferred unsaturated acids are those of up to 4 carbon atoms which are acrylic acid, methacrylic acid and crotonic acid. Acrylic acid is a particularly preferred component of the ethylene-unsaturated acid copolymer.

The ethylene-unsaturated acid copolymers are those copolymers having a relatively large proportion of ethylene and a relatively small proportion of the unsaturated acid. Typical ethylene copolymers are from about 78% by weight to about 95% by weight based on total copolymer of the $\alpha,\beta$-ethylencially unsaturated carboxylic acid. The copolymers preferably have from about 5% by weight to about 12 by weight based on total copolymer of the unsaturated acid.

The method by which the copolymers are produced is not material and ethylene-unsaturated acid copolymers produced by a variety of methods are useful in the blends of the invention. A number of ethylene-acrylic acid copolymers and ethylene-methacrylic acid copolymers are commercially available. A general discussion of the production of ethylene-unsaturated acid copolymers is found in Thompson et al, U.S. Pat. No. 3,520,861 and Armitage, U.S. Pat. No. 4,351,931, incorporated herein by reference. A particularly useful class of ethylene-acrylic acid copolymers is marketed by Dow Chemical Company under the tradename PRIMACOR, such as Primaco TM 1410, with an ethylene content of 89%, an acrylic acid content of 11% and a melting point of 95° C., and a useful class of ethylene-methacrylic acid copolymers is marketed by DuPont Co. under the tradename NUCREL.

The method of producing the blends of the invention is not material so long as a relatively uniform distribution of the maleated, partially hydrogenated block copolymer and the ceramic reinforcement throughout the polyketone is obtained. The blend is a non-miscible blend with the minor components existing as a discrete phase in the polyketone matrix. The blend will not, therefore, be homogeneous but good results are obtained when the distribution of the minor components throughout the polyketone is substantially uniform. The method of producing the blend is that which is conventional for non-miscible polymeric materials. In one modification, the blend components in particulate form are mixed and passed through an extruder operating at high RPM to produce the blend as an extrudate. In an alternate modification, the components are blended in a mixing device which exhibits high shear.

The blends of the invention may also include conventional additives such as antioxidants, stabilizers, fillers, fire retardant materials, mold release agents and other substances which are added to improve the processability of the components or to modify the properties of the resulting blend. Such additives are added by conventional methods prior to, together with or subsequent to the blending of the components.

The blends of the invention are characterized by improved toughness and impact resistance. The blends are of particular utility where the articles produced from the blends of the invention are likely to be subjected to impact. The blends are processed by conventional techniques such as injection molding or extrusion into sheets, sheet casting, films, plates or shaped articles. The formed polymer articles find utility in the packaging industry, in the production of containers as for food or drink and in the production of external and internal parts for automotive applications.

The polyketone polymer/ceramic fiber compositions of the invention are uniform blends having mechanical properties such as flex modulus improved over polymer without ceramic fiber. In addition, the polyketone polymer/ceramic fiber compositions of the invention show certain improved properties over comparable polyketone polymers reinforced with glass fiber. In particular, the ceramic fiber reinforced compositions show improved melt processability over glass reinforced compositions. Substituting ceramic fiber for glass fiber as polyketone reinforcement allow repetitive melt extrusions of the reinforced compositions before injection molding and improves cycle times for the molding. In terms of cycle times, melt processability for the ceramic fiber reinforced compositions is improved over glass fiber reinforced compositions and over the neat polymer without reinforcement.

It is expected that these novel formulations will have utility for car parts, body panels, valve fittings and similar end uses. It is expected that this kind of blend polymer will be usable in a variety of end uses and processable by conventional techniques known in the packaging, automotive, and sheet film industries.

The invention is further illustrated by the following Illustrative Embodiments which should not be regarded as limiting.

Illustrative Embodiment I

A linear alternating terpolymer (87/032) was prepared employing a catalyst composition formed from palladium acetate, the anion of trifluoroacetic acid and 1,3-di(2-methoxyphenyl)phosphino]propane). The terpolymer had a melting point of 220° C. and a limiting viscosity number, measured at 60° C. in m-cresol, of 1.96. This polymer is referred to hereafter as Formulation 1.

Comparative Illustrative Embodiment II

A blend was prepared of the linear alternating terpolymer of Illustrative Embodiment I with 2% by weight, based on total blend, of KRATON 1901x, a maleated, partially hydrogenated block copolymer of the SES/SEBS type having 28% by weight styrene and 2% by weight of maleic anhydride grafted to the mid-block of the block copolymer, using conventional blending apparatus. This blend is referred to hereafter as Formulation 2. After blending, a 30 mm corotating twin screw extruder having seven zones and a total L/D of 27/1 was used. The melt temperature at the die exit was 260° C. and the zone temperatures along the barrel were maintained at 466° F. All blends were devolatized under vacuum (40 in Hg) at the zone adjacent to the die. The blend was extruded into water and pelletized in a conventional manner.

Pellets were injection molded into standard ASTM tensile bars for testing with the pellets being dried prior to molding.

Samples for testing were injection molded on an Engel (8 oz) injection molder equipped with a 2.2/1 compression ratio screw. The cycle time for the samples was about 5 seconds. Standard test specimens were molded in a family mold and samples were immediately placed in a dry box.

Flex modulus and notched izod were measured by standard ASTM methods for each sample. The test results appear below in Table 1.

Comparative Illustrative Embodiment III

Formulation 3 was prepared in a manner identical to Formulation 2 but using 5 wt % KRATON 1901X. Test results for Formulation 3 appear on Table 1.

Comparative Illustrative Embodiment IV

Formulation 4 was prepared in a manner identical to Formulation 2 but using 7 wt % KRATON 1901X. Test results for Formulation 4 appear on Table 1.

Comparative Illustrative Embodiment V

Formulation 5 was prepared in a manner identical to Formulation 2 except 1% by weight of ethylene acid copolymer, hereinafter referred to as "EAA", Primacor 1410 was added to the polyketone and no KRATON 1901X was used. Test results for Formulation 5 appear in Table 1.

Comparative Illustrative Embodiment VI

Formulation 6 was prepared in a manner identical to Formulation 2 except 5% by weight of Primacor 1410 was used instead of 1% by weight Primacor 1410. Test results for Formulation 6 appear in Table 1.

Comparative Illustrative Embodiment VII

Formulation 7 was prepared in a manner identical to Formulation 3, however 1% by weight Primacor 1410 was additionally added to the blend. Test results for Formulation 7 appear in Table 1.

Comparative Illustrative Embodiment VIII

Formulation 8 was prepared in a manner identical to Formulation 7, except 5 wt % of the Primacor 1410 was used. Test results for Formulation 8, appear in Table 1.

Comparative Illustrative Embodiment IX

Formulation 9 was prepared in a manner identical to Formulation 2, however the linear alternating terpolymer was changed to 087/015 which was prepared using a catalyst formed from palladium acetate, the anion of trifluoroacetic acid and 1,3-di[(2-methoxyphenyl)phosphino]propane. This terpolymer had a melting point of 228° C. and an LVN of 1.5 measured at 60° C. in m-cresol. Further, 83.50 wt % of the terpolymer was blended with 0.5 wt % of a stabilizer, Ethanox 330, available from Ethyl Corporation, and 5 wt % KRATON 1901x, a maleated, partially hydrogenated block copolymer of the SES/SEBS type having 28% by weight styrene and 2% by weight of maleic anhydride grafted to the mid-block of the block copolymer. Additionally, 10% by weight, based on total blend, of chopped Fiberfrax® EF-112 ceramic fibers, commercially available from Standard Oil Engineered Material Company, Fibers Division are added to the blend. Fiberfrax EF-112 is a refractory ceramic fiber having a fiber length about 13 Mm, a mean fiber diameter of 2–3 microns and a specific gravity of 2.73 g/cm$^3$ and a melting point of 1790° C. These ceramic fibers are sized with a commercial sizing designed for use with phenolic, epoxy, nylon, melamine and polyurethane systems. Additionally, 1% by weight Primacor 1410, a processing additive was added to the blend. Test results for Formulation 9 appear on Table 2.

Illustrative Embodiment X

Formulation 10 was prepared in a manner identical to Formulation 9, however, 79.50 wt % of the terpolymer was blended with 0.5 wt % of a stabilizer, Ethanox 330, and 5 wt % KRATON 1901X, a maleated, partially hydrogenated block copolymer of the SES/SEBS type having 28% by weight styrene and 2% by weight of maleic anhydride grafted to the mid-block of the block copolymer. Further, 10% by weight, based on the total blend, of chopped Fiberfrax ® EF-112 ceramic fibers, and 5% by weight Primacor 1410 were added to the blend. Test results for Formulation 10 appear on Table 2.

Illustrative Embodiment XI

Formulation 11 was prepared from the polyketone terpolymer 087/015 identified in Embodiment 9. This blend was prepared in a manner identical to that used in Formulation 2 except that the blend was only a three part blend of 5% by weight chopped Fiberfrax ® EF-112 ceramic fibers with 0.5% by weight Ethanox 330, and the remainder being the novel polyketone. Test results for Formulation 11 appear on Table 2.

Illustrative Embodiment XII

Formulation 12 was prepared in a manner identical to Formulation 11, however the amount of Fiberfrax EF-112 was increased to 10% by weight with a corresponding reduction in the amount of polyketone polymer. Test results for Formulation 12 appear on Table 2.

Illustrative Embodiment XIII

Formulation 13 prepared like Formulation 2, comprises the polyketone terpolymer 087/015 blended with 0.5 wt % Ethanox 330 and 15% by weight of the chopped ceramic fibers, Fiberfrax EF-112. The test results appear on Table 2.

Illustrative Embodiment XIV

Formulation 14 prepared like Formulation 2 comprises the polyketone terpolymer 087/015 blend with 0.5 wt % Ethanox 330 and 10% by weight of non-sized ceramic fiber EF-112. The test results appear on Table 2.

Illustrative Embodiment XV

Formulation 15 is the control, polyketone terpolymer 087/015 prepared from a catalyst formed from palladium acetate, the anion of trifluoroacetic acid, and 1,3-di(2-methoxyphenyl)phosphino propane. It has a melting point of 228° C. and an LVN of 1.5 measured at 60° C. in m-cresol. Formulation 15 consists of 087/015 blended with 0.5 wt % of Ethanox 330. It was prepared into samples tested in the manner described in Formulation 2.

TABLE 2

| TESTS | FORMULATIONS 9 | 10 | 11 | 12 | 13 | 14 | 15 |
|---|---|---|---|---|---|---|---|
| Notched Izod[1] | | | | | | | |
| Room Temperature | 3.9 | 2.7 | 1.1 | 1.2 | 1.3 | 1.3 | 4.0 |
| −20° F. | | | — | — | — | — | 1.1 |
| Tensile Modulus[2] (psi) | 8000 | | — | — | — | — | 1.1 |
| Flexural Modulus[3] (psi) | 406,000 | 299,000 | 322,000 | 373,000 | 415,000 | 323,000 | 294,000 |
| Gardenier Impact[4] (in./lbs.) | 17 | 9 | 40 | 32 | 18 | | |

[1]ASTM D-256
[2]ASTM D-638
[3]ASTM D-790
[4]ASTM D-3029

From Tables 1 and 2 it can be seen that adding KRATON 1901X at the 2–7% by weight level substantially increases notched izod impact resistance. It also appears, according to the Gardener Impact Data, that adding 1% of a processing aid, like Primacor 1410 promotes cavitation and enhances impact resistance by dispersing into the polymer matrix at the submicron level. This processing aid is preferred for use with the KRATON 1901X and ceramic fibers.

In sum, the impact resistance of the base polymer appears improved when maleated elastomers are added to the polyketone polymer ceramic fiber blend. It is anticipated that if dispersed phase impact modifiers are added to the filled polymer which have submicron diameters, such as 1.0 μm or less, the impact modification will be significantly improved.

What is claimed is:

1. A composition comprising a non-miscible blend of, as a major component, a linear alternating polymer of carbon monoxide and at least one ethylenically unsaturated hydrocarbon and lesser amounts of a maleated, partially hydrogenated block copolymer, said block copolymer having at least one at least predominantly

TABLE 1

| TESTS | COMPARATIVE FORMULATIONS 1 | 2 | 3 | 4 | 5 | 6 | 7 | 8 |
|---|---|---|---|---|---|---|---|---|
| Notched Izod[1] | | | | | | | | |
| Room Temperature | 4.0 | 15.8 | 19.3 | 22.7 | 7.0 | 7.3 | 19.9 | 3.5 |
| −20° F. | 1.1 | 1.5 | 4.8 | 4.3 | — | — | — | — |
| Tensile Modulus[2] (psi) | 8300 | 7700 | — | — | — | — | 7400 | >50% |
| Flexural Modulus[3] | 294,000 | 261,000 | 313,000 | 290,000 | 254,000 | 225,000 | 283,000 | 231,000 |
| Gardenier Impact[4] | 315 | >320 | 125 | 38 | >320 | 110 | — | — |

[1]ASTM D-256
[2]ASTM D-638
[3]ASTM D-790
[4]ASTM D-3029 polymerized vinyl aromatic compound block and at least one at least predominantly polymerized conjugated alkadiene block, and ceramic fiber reinforcement.

2. The composition of claim 1 wherein the linear alternating polymer is represented by the repeating formula $$\left[CO-(CH_2-CH_2)\right]_x\left[CO-(G)\right]_y$$

wherein G is the moiety of ethylenically unsaturated hydrocarbon of at least 3 carbon atoms polymerized through the ethylenic unsaturation and the ratio of y:x is no more than about 0.5.

3. The composition of claim 2 wherein the maleated partially hydrogenated block copolymer is a maleated block copolymer derived from (1) a block copolymer precursor wherein i) each A block independently is a block of at least predominantly polymerized vinyl aromatic compound selected from styrene or alpha-methylstyrene, the average molecular weight of each A block being from about 5,000 to about 125,000, ii) each B block independently is a block of at least predominantly polymerized alkadiene selected from butadiene or isoprene, the average molecular weight of each B block being from about 10,000 to about 300,000, and iii) the A blocks being from about 2% by weight to about 55% by weight of the total block copolymer; and (2) a partially hydrogenated block copolymer precursor containing residual aliphatic block unsaturation from about 0.5% to about 20% of the unsaturation of the aliphatic block of said block copolymer, said maleated partially hydrogenated block copolymer containing from about 0.02% by weight to about 20% by weight, based on total polymer, of moieties of maleic acid compound grafted to the polymer aliphatic block.

4. The composition of claim 3 wherein the ceramic fiber reinforcement is from about 0.1% by weight to about 45% by weight of the total blend.

5. The composition of claim 4 wherein y is 0.

6. The composition of claim 4 wherein G is a moiety of propylene.

7. The composition of claim 6 wherein the ratio of y:x is from about 0.01 to about 0.1.

8. The composition of claim 6 wherein the vinyl aromatic compound is styrene and the alkadiene is butadiene, and the maleated partially hydrogenated block copolymer is from about 0.5% by weight to about 10% by weight of the total blend.

9. The composition of claim 8 wherein the ceramic fiber reinforcement is from about 0.5% by weight to about 35% by weight based on total blend.

10. The composition of claim 9 wherein the maleated, partially hydrogenated block copolymer is from about 2% by weight to about 7% by weight of the total blend.

11. The composition of claim 10 wherein the ratio of y:x is from about 0.01 to about 0.1.

12. A molded article comprising the composition of claim 1.

* * * * *